United States Patent

Inose et al.

[15] 3,692,942

[45] Sept. 19, 1972

[54] MULTIPLEXED INFORMATION TRANSMISSION SYSTEM

[72] Inventors: Hiroshi Inose; Tadao Saito; Takehisa Tokunaga; Kenji Tomizawa, all of Tokyo, Japan

[73] Assignee: Bell Telephone Laboratories, Incoporated, Murray Hill, N.J.

[22] Filed: June 7, 1971

[21] Appl. No.: 150,352

[52] U.S. Cl...........179/15 BV, 179/15 A, 179/15 BS

[51] Int. Cl...............................................H04j 3/16

[58] Field of Search.179/15 BV, 15 A, 15 BA, 15 BS

[56] References Cited

UNITED STATES PATENTS

| | | | |
|---|---|---|---|
| 3,535,450 | 10/1970 | Vollmeyer | 179/15 BS |
| 3,591,722 | 7/1971 | Palsa | 179/15 BA |
| 3,306,979 | 2/1967 | Ingram | 179/15 BA |
| 3,241,135 | 3/1966 | Kuflic | 179/15 BV |

*Primary Examiner*—William C. Cooper
*Assistant Examiner*—David L. Stewart
*Attorney*—R. J. Guenther and R. B. Ardis

[57] ABSTRACT

A time division multiplex communication system operates to combine the transmissions from the plurality of low speed multiplex paths onto a single high speed path having a transmission rate of C. The incoming information from each low speed path is stored in a buffer memory. A gating circuit selectively applies the stored information from the buffer memory to the high speed path in assigned time slots of said high speed path. A control unit connected to each gating circuit selectively enables one of said gating circuits in each time slot of said outgoing path in accordance with an algorithm which applies said stored information to said outgoing path in a quasi-uniform manner.

11 Claims, 10 Drawing Figures

INVENTORS: H. INOSE
T. SAITO
T. TOKUNAGA
K. TOMIZAWA
BY J S Cubert
ATTORNEY

MULTIPLEXED INFORMATION TRANSMISSION SYSTEM

BACKGROUND OF THE INVENTION

Our invention is related to time division multiplex transmission systems and more particularly to arrangements for multiplexing information from a plurality of diverse transmission rate time division paths onto a single path having a higher transmission rate.

In time division multiplex systems, a plurality of signals are combined onto a single transmission path on a time separation basis. Each signal is assigned to a common path for a very short but rapidly recurring interval termed a time channel. Samples which retain the essential characteristics of a signal are transmitted over the common path in these time channels. Such samples may then be utilized at equipment connected to the terminating end of a switching network including said path to reconstruct the original signal so that reception of signals of any complexity through the time division network is satisfactory. In accordance with well-known principles, this requires that each sampling rate be at least twice the bandwidth of the appointed input signal.

A time division network may include a plurality of common paths over each of which data or other form of digitally coded information is transmitted. It is often required that the information from such a plurality of paths be multiplexed onto a single transmission path. In that event, the pulses from the plurality of transmission paths must be assigned to time channels or time slots on the single higher speed path. In modern communications systems, each of the plurality of transmission paths may carry information pulse trains having a bandwidth differing from that of the other paths to be multiplexed onto a single higher speed path. One path, for example, may carry data information, another path may carry video communication information and a third path may carry PCM coded information. On every low speed transmission path, each information bit is assigned to time slot having a duration corresponding to the width of an information pulse. Where the outputs of several transmission paths are multiplexed onto a common higher speed path, each low speed path pulse must be assigned to a suitable shorter duration time slot on the higher speed path.

In general, where input pulse trains, having M different data speeds are multiplexed, M time slot trains on the high speed path must be assigned to each of the input lines. The transmission of a particular input pulse train in the assigned time slots requires that a buffer memory be provided to compensate for the time displacement between the input pulses from the low speed transmission paths and the assigned time slots of the high speed path. If the pulses of an input pulse train occur uniformly, the separation of assigned time slots in the high speed line may be more uniform and the required capacity of the needed buffer memory becomes smaller. There are, however, many instances where uniform time slot assignments are not possible or would unduly limit the multiplexing arrangement. Since various combinations of input pulse trains may be applied to a time division multiplex system, it is desirable to use a simple time slot assignment scheme that may be applied to any combination of such pulse trains.

One prior art technique for time slot assignment is that of block transmission wherein a predetermined number of pulses from a lower speed input path are assigned to a block of successive time slots in each frame of the higher speed path. In such an arrangement, the capacity of the buffer memory for each input path is proportional to the transmission rate of the high speed path. Thus, the higher the transmission rate of the high speed line, the larger is the buffer memory capacity at each of the input lines whereby the multiplexing arrangements may become unduly complicated and more expensive.

BRIEF SUMMARY OF THE INVENTION

Our invention is a time division multiplex transmission system that includes a plurality of input transmission paths and an output transmission path having a higher transmission rate than any of the input transmission rates and wherein the transmission rate of the output path is equal to the sum of the transmission rates of the input paths. A network combines the transmissions of the input paths into a single multiplexed transmission on the output path at the output path transmission rate. The transmission on the output path occurs in repetitive cycles of C time slots, where C is the transmission rate of the output path. The multiplexing network includes storage apparatus associated with each input path into which the information bits from the connected path are inserted. Control means operate to determine the readout of the buffer memories in selectively designated time slots of the output path frame.

The control means includes calculating means operative to successively divide the input lines transmission rates into partial sum groups Ca and Cb wherein Ca ≥ Cb and $Ca + Cb = C'$. Time slots of said output path are assigned to the Ca group in accordance with $$\lceil (k-1)\, C'/Ca \rceil + 1 \quad (\text{for } k = 1, 2, \ldots Ca)$$

and time slot assignments are made to the *Cb* group in accordance with $$[\, (k-1)\, C'/Cb \,] + 2 \quad (\text{for } k = 1, 2, \ldots Cb).$$

$\lceil\ \rceil$ indicates raising the included value to the next higher integer and [ ] indicates eliminating any included fractional value. Codes corresponding to the time slot assignments to such input path are generated and signals responsive to the assignment codes are selectively applied to gating means connected between each storage apparatus and the output path whereby the stored information is multiplexed onto the output path on a semiuniform basis. The semiuniform time slot assignment simplifies the demultiplexing of the high speed transmission so that complex filtering is replaced by relatively simple delay apparatus.

According to one aspect of the invention, each storage apparatus includes a plurality of storage devices for storing the information bits sequentially applied from the corresponding input line. The number of storage devices in each storage apparatus corresponds to the total number of different speed input lines of the arrangement. The input pulses are applied to the devices in succession according to the incoming transmission rate. The stored information bits in the buffer memory are read out under control of signals derived from the control unit in accordance with the semiuniform time slot assignment algorithm. Advantageously the number of devices in each buffer memory is limited to the total number of different speed incoming lines of the system.

According to another aspect of the invention, signals corresponding to the time slot assignment codes are applied to further storage means which operate in conjunction with clock pulses synchronized to the transmission rate of the high speed line to selectively enable the gating means connected between the buffer memories and the high speed line in each time slot. In this way, the stored information from the buffer means are multiplexed onto the high speed line in accordance with the aforementioned algorithm.

According to yet another aspect of the invention, the calculating means includes means for storing the transmission rates of the input paths and the output path and means responsive to said stored rates for forming an array of codes corresponding to a time slot allocation tree having a plurality of nodes and branches connecting said nodes. The highest order node of the tree represents the sum of the input transmission rates, and nodes of lesser order represent partial sums of combinations of the input transmission rates. Each of the lowest order branches of the tree represents one of the input transmission rates. The allocation tree code array is used in accordance with the time slot assignment algorithm to generate time slot assignment codes for each input transmission path.

According to still another aspect of the invention, the code array corresponds to a time slot allocation tree wherein each node has two branches connecting to a lower order node whereby the number of nodes representing *n* different input transmission rates is $\log_2(n)$.

DETAILED DESCRIPTION OF THE INVENTION

Figure 1:
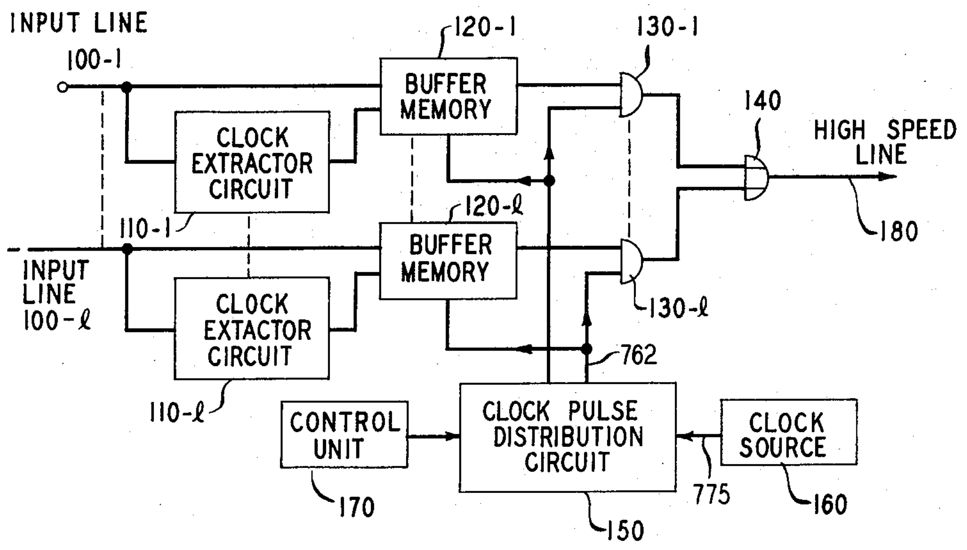
FIG. 1 depicts a block diagram of an illustrative embodiment of the invention.

FIG. 1 shows an illustrative embodiment of the invention wherein pulse information from input lines 100-1 through 100-l are multiplexed onto high speed line 180. In FIG. 1, each of input lines 100-1 through **100-*l* is connected to an associated one of buffer memories 120-1 through 120-*l*. Each of the buffer memories is in turn connected via one of gates 130-1 through 130-*l* to high speed line 180 through OR gate 140. Control unit 170 includes calculating apparatus which is operative to determine time slot assignments and to generate time slot assignment codes in accordance with the semiuniform time slot assignment algorithm of the invention. Signals corresponding to the time slot assignment codes are applied to clock distribution circuit 150 which operates in response to the signals from control unit 170 and clock pulses from clock source 160 to selectively control the buffer memories and gates 130-1 through 130-*l* so that information stored in buffer memories 120-1 through 120-*l* are appropriately multiplexed onto high speed line 180**.

The writing of incoming line information into each of buffer memories 120-1 through **120-*l* is controlled in accordance with the clock rate of the associated input line. This is done via clock extractor circuits 110-1 through 110-*l*. For example, clock extractor circuit 110-1 is connected between input line 100-1 and buffer memory 120-1. The clock extractor circuit 110-1 receives the pulse information from line 100-1 and in response thereto applies clock pulses to buffer memory 120-1 so that the bits of the pulse train from line 100-1 are sequentially written into the storage devices of buffer memory 120-1. In accordance with the invention, the pulse train from each line is written into a separate buffer memory under control of the input line transmission rate. The contents of each buffer memory are read out therefrom to the connected gate of gates 130-1 through 130-*l***.

The pulses to control gates 130-1 through **130-*l* are applied from distribution circuit 150 in response to pulses from clock source 160 and control information from control unit 170. Thus, a pulse is applied from distribution circuit 150 to one of gates 130-1 through 130-*l* for the duration of each time slot of high speed line 180. The selected gate of gates 130-1 through 130-*l* allows stored information from the connected buffer memory to pass therethrough and through OR gate 140 in selected time slots to high speed line 180. In this way, the information assembled in buffer memories 120-1 through 120-*l* is multiplexed onto high speed line 180, synchronous to the time slot timing of line 180 derived from clock 160**.

Figure 2:
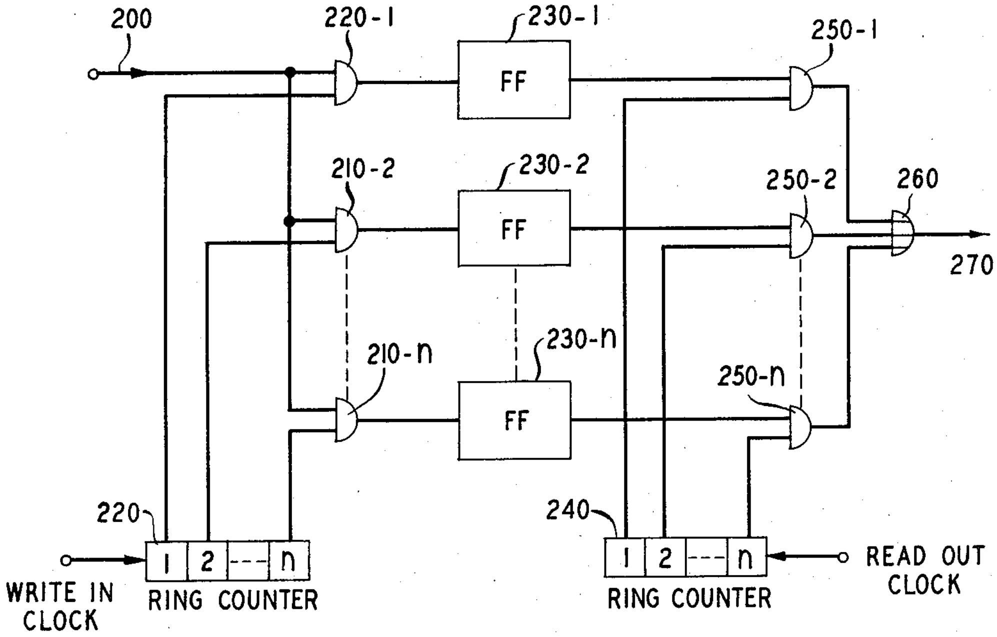
FIG. 2 shows a block diagram of a buffer memory useful in the illustrative embodiment of FIG. 1.

FIG. 2 shows a detailed block diagram of a memory circuit that may be used in buffer memories 120-1 through **120-*l*** of FIG. 1. It is to be understood that other types of memories may be used and that storage devices other than flip-flops may also be used. The buffer memory comprises a set of *n* flip-flops, 230-1 through **230-*n*, which serve as information bit storage devices. A plurality of input AND gates 210-1 through 210-*n* operate to selectively insert information from the input line via lead 200 into the connected flip-flop of flip-flops 230-1 through 230-*n*. A plurality of output AND gates serve to transfer stored information from flip-flops 230-1 through 230-*n* to the associated gate of 130-1 through 130-*l* via OR gate 260 and lead 270**.

The insertion of information bits from an input line via lead 200 into flip-flops 230-1 through **230-*n* is done under control of ring counter 220. Ring counter 220 receives clocking pulses from the clock extractor circuit connected between the input line and the buffer memory. Assume that stage 1 of counter 220 has been set by a write-in clock pulses from the associated extractor circuit. The output of stage 1 at this time enables gate 210-1 so that the information bit then present on lead 200 causes flip-flop 230-1 to be operated. The next writetin clock pulse sets stage 2 and resets stage 1 of ring counter 220. This clock pulse is associated with the next succeeding information bit on lead 200. The output of stage 2 enables gate 210-2 so that the information bit then present on lead 200 is inserted into flip-flop 230-2. In this way, the successive information bits from lead 200 are sequentially applied to flip-flops 230-1 through 230-*n*. Counter 220 is operated in repetitive cycles of $n$ write-in clock pulses so that stage 1 is set when stage n is reset. Thus $n$ bits from lead 200** are stored in the flip-flops of the buffer memory of FIG. 2.

During the ring counter cycle, each stored bit must be read out prior to the next write-in to that store position. Ring counter 240 controls the operation of readout gates 250-1 through **259-*n*. This ring counter is stepped in response to readout clock pulses derived from distribution circuit 150. Thus, when stage 1 of ring counter 240 is set, gate 250-1 is enabled whereby the stored bit from flip-flop 230-1 is applied to lead 270 via gates 250-1 and 260. The next readout clock pulse sets stage 2 and resets stage 1 so that the output of flip-flop 230-2 is applied to line 270. In this manner, gates 250-1 through 250-*n* are sequentially enabled in order whereby the information bits stored in the buffer memory are read out sequentially from flip-flops 230-1 through 230-n and the write-in sequence is preserved. The buffer memory of FIG. 2 stores the input signal applied to lead 200 for a time corresponding to $n$ time slots of line 180** and the stored signal in the buffer memory is read out therefrom in arbitrary time slots among these $n$ time slots.

In the arrangement of FIG. 1, the information transmission rates on the low speed input lines 100-1 through **100-*n* are mutually synchronized in accordance with well-known principles so that there exists a greatest common divisor relating each bit rate to a normalized bit transmission rate. The transmission rate of high speed output line 180** is also arranged to be an integral multiple of the normalized rate. Where the transmission rate of the high speed line is C, the time slots of the high speed line may be divided into frames of C time slots each. In accordance with the invention, one bit of a low speed input signal having the normalized transmission rate occurs for the duration of one output line frame of $C$ time slots and is multiplexed onto the output line in one time slot of the high speed frame. Where a signal has a transmission rate of $C_i$, $C_i$ bits occurs during each high speed frame and $C_i$ time slots of the high speed frame are required to transmit the information on the high speed output line.

Figure 3:
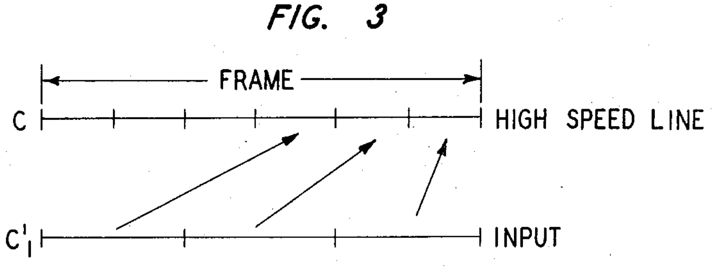
FIG. 3 shows a time slot assignment scheme using block transmission.

FIG. 3 illustrates the priorly known block transmission technique for multiplexing a plurality of low speed transmissions onto a high speed line. In FIG. 3, a frame of the high speed line has $C$ time slots. The high speed line frame coincides with the total duration of the illustrated $C_i$ bits of an input line. These $C_i$ bits are assigned to the last occurring $C_i$ time slots of the high speed line frame. In such a block multiplexing arrangement, the largest number of memory devices in a buffer memory is required when $$C_i = C/2 \qquad (1)$$

and the required number of memory devices $n$ may be expressed by $$n = C/4 + 1. \qquad (2)$$

When the necessary time slot positions shift in a frame because of the effects of other input line transmissions the required memory capacity increases to $$n = C/2 + 3\,. \qquad (3)$$

As is apparent from equation 3, the maximum memory capacity of each buffer memory is proportional to the transmission rate of the high speed line. In the time slot assignment scheme according to the invention, the required maximum buffer memory capacity for each input line can be made less then $$n = \tfrac{1}{2}\,(\log_2 C{+}1). \qquad (4)$$

In general $$n = \log_2 (m) \qquad (4a)$$

where $m$ is the number of different transmission rate input lines. Therefore, in the system in which the transmission rate of the high speed line becomes larger, a considerable savings in memory capacity can be achieved through use of our invention.

For purposes of description of the time slot assignment scheme in accordance with the invention, assume an arrangement wherein there are two input lines having signal transmission rates of $C_1$ and $C_2$, respectively, that $C_1$ and $C_2$ are multiplexed onto a high speed line having a transmission rate of $C$. In accordance with the aforementioned constraints, $C_1 \geq C_2$ and $C_1 + C_2 = C$. Since $C_1 \leq C$, at least one time slot of the high speed transmission line is included in the time interval of two bits of the $C_1$ rate signal. Thus, where the $C_1$ line buffer memory has a capacity of one bit, the $C_1$ rate signal can always be transmitted by the high speed line. In accordance with the invention, the earliest possible high speed line time slot is assigned to the $C_1$ rate signal. This is assured by time slot assignment for the $C_1$ signal group as follows:

$$t_{C_1k} = \lceil (k\text{-}1)\, C/C_1 \rceil + 1 \ (\text{for } k = 1,2,\ .\ .\ .,\ C_1). \qquad (5)$$

The remaining time slots of the high speed frame are assigned to the $C_2$ signal, and these time slot numbers are $$t_{C_2k} = [\,(k\text{-}1)\, C_1/C\text{-}C_1\,] + k + 1 \ (\text{for } k = 1,2,\ .\ .\ .,\ C_2)$$

$$= [\,(k\text{-}1)\, C/C_2\,] + 2 \ (\text{for } k = 1,2,\ .\ .\ .,\ C_2) \qquad (6)$$

where $\lceil\ \rceil$ means that the included fractional value is raised to the next higher integer and [ ] means that the included fractional value is eliminated.

Figure 4:
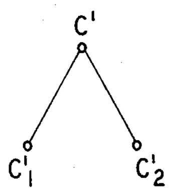
FIG. 4 illustrates a semiuniform time slot assignment tree arrangement which may be implemented in the illustrative embodiment of FIG. 1.

The time slots assigned to the $C_1$ signal may be further allocated to signals having lower transmission rates such as $C_{11}$ and $C_{12}$ where $C_{11} \geq C_{12}$ and $C_{11} + C_{12} = C_1$. The time slots assigned to $C_2$ may be subdivided in like manner. In this way, a time slot assignment scheme may be provided for four incoming signal rates. In applying equations 5 and 6 to the subdivision of the $C_1$ rate, the high speed frame time slots assigned to $C_1$ are considered as a separate high speed frame and the two low speed signals having rates $C_{11}$ and $C_{12}$ are considered as input transmission rates to the $C_1$ high speed frame. The assigned time slots for rate $C_{11}$ are obtained by substituting $C_1$ for $C$ and $C_{11}$ for $C_1$ in equation 5. Similarly, the assigned time slots for the $C_{12}$ signal are obtained by substituting $C_1$ for $C$ and $C_{12}$ for $C_2$ in equation 6. In like manner, the $C_2$ time slots of a high speed line are allocated to signals $C_{21}$ and $C_{22}$ where $C_{21} \geq C_{22}$ and $C_{21} + C_{22} = C_2$. In this way, $C'$ time slots assigned to a $C'$ speed signal are further assigned to two signals having rates of $C_1'$ and $C_2'$ in accordance with equations 5 and 6. The tree structure of FIG. 4 illustrates this time slot assignment scheme. In general, the time slot assignment for $2^R$ different rate signals can be expressed by a tree structure of R stages similar to that of FIG. 4.

As an example of the time slot assignment scheme according to equations 5 and 6, consider the time slot assignments of four signals each from different input line having normalized transmission rates of 2, 3, 4 and 5, respectively, which are to be multiplexed on a high speed line having a normalized rate of 14. The first step is to divide the high speed line rate of 14 into 2 parts so that $C_1 = 9$ and $C_2 = 5$. In accordance with equations 5 and 6, the high speed time slots assigned to $C_1$ are $$\underline{t_{C_1k}} = 1, 3, 5, 6, 8, 9, 11, 12, 14$$

and the high speed time slots assigned to $C_2$ are $$\underline{t_{C_2k}} = 2, 4, 7, 10, 13\ .$$

Figure 5A:
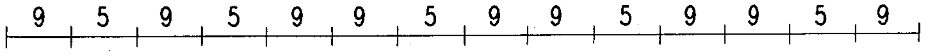
FIGS. 5A, 5B, and 5C show time charts and a time slot allocation tree illustrating one example of time slot assignment that may be implemented in the illustrative embodiment of FIG. 1.

This assignment is illustrated in FIG. 5A.

Figure 5B:
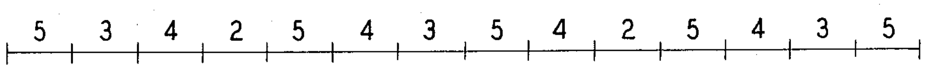
Figure 5C:
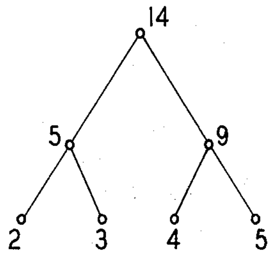

The $C_1$ rate is then further divided into two rates, $C_{11} = 5$ and $C_{12} = 4$. The time slots from the $C_1$ group, in accordance with equations 5 and 6, are then further assigned to the $C_{11}$ and $C_{12}$ groups as follows:

for $C_{11}$ $t_{C_{11}k} = 1, 3, 5, 7, 9$
for $C_{12}$ $\underline{t_{C_{12}k}} = 2, 4, 6, 8.$ The assignments for $C_{11}$ and $C_{12}$ are then translated into time slot assignment numbers of the frame 14 time slots as follows:

for $C_{11}$ $t'_{C_{11}k} = 1, 5, 8, 11, 14$
for $C_{12}$ $\underline{t'_{C_{12}k}} = 3, 6, 9, 12.$ In a similar manner, the $C_2$ rate is subdivided so that $C_{21} = 3$ and $C_{22} = 2$. The time slot assignment members of the frame of 14 time slots then becomes for $C_{21}$ $t_{C_{21}k} = 2, 7, 13$
for $C_{22}$ $t_{C_{22}k} = 4, 10.$ The final time slot assignment for the four rates is illustrated in FIG. 5B, and the time slot assignment tree corresponding to FIG. 5B is shown in FIG. 5C. It is to be understood that the assignment tree is not uniquely defined and other tree structures are possible. Where other tree structures are used, different time slot assignments result. It is to be further understood that when there are three rates $C_{11}$, $C_{12}$ and $C_{21}$ to be multiplexed, and $C_{11} + C_{12} + C_{21} \leq C$, an imaginary rate $C_{22}$ may be added in implementing equations 5 and 6.

As is readily apparent from the foregoing, the number of bits in each buffer memory in FIG. 1, is not a function of the transmission rates of the input lines or the transmission rate of the output line; but rather the number of bits is proportional to the number of different input speed lines. Thus the time slot assignment for an arrangement of two different transmission rate input lines requires only a buffer memory capacity of one bit for each line. A time slot assignment arrangement for such a system is illustrated in FIG. 4 wherein the time slot allocation tree has one node corresponding to $C' = C_1 + C_2$, and branch corresponding to $C_1$ and a branch corresponding to $C_2$. Where the time slot allocation tree arrangement has R stages of nodes, a buffer memory of R bits is sufficient for each of the input lines.

The multiplexing scheme of FIG. 1 may be used where $l_t$ lines, each having the same transmission rate of $C_t$, are included among the input lines. Since all of the $l_t$ lines have the same transmission rate, they may be provided for according to the invention by considering the $l_t$ lines as a single input line having a transmission rate of $C'_t = l_t \times C_t$. Where there are a maximum number of different transmission rate lines, the required number of bits for each buffer memory is determined by equation 4.

Assume that the transmission rates of the input signals to be multiplexed in accordance with the invention are $C_1$, $C_2$–, $C_t$, $C_m$ and that $l_t$ lines each has a transmission rate of $C_t$. In this event, $m'$ kinds of transmission rates are included for use with equations 5 and 6, whereby a time slot allocation tree of $\log_2 m'$ node stages provides the required time slot assignments. The transmission rates of the input lines are allocated to each of the lowest branches of the allocation tree. A transmission rate of zero is allocated for each residual lowest branch. The semiuniform time slot assignments are then made in accordance with the allocation tree selected and equations 5 and 6. The resulting time slot assignments are then arranged to correspond to the lowest branches of the selected allocation tree. The time slots assigned to the transmission rate of $C_t'$ are periodically assigned to the $l_t$ signals, each which has a transmission rate of $C_t$.

Figure 6A:
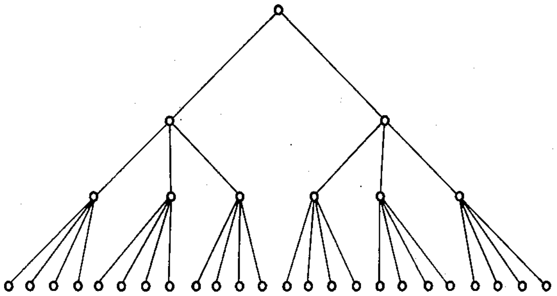
FIGS. 6A and 6B show other examples of time slot assignment trees that may be implemented in the illustrative embodiment of FIG. 1.
Figure 6B:
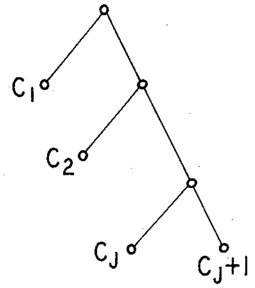

The priorly selected allocation tree has two branches at each node. As shown in FIG. 6A, however, the number of branches at the jth stage of a tree may be $j + 1$. In this event, the partitioning of the time slot assignments for transmission rate signals of rates $C_1$, $C_2$,–, $C_j + 1$ is done by means of $j$ semiuniform time separations as is illustrated in FIG. 6B. If $C_1 \geq C_2 \ldots \geq C_j$, $C_t$ is partitioned into $C_1$, $(C_2 + C_3 + \ldots C_j)$. Then $(C_2 + C_3 + \ldots C_j)$ is partitioned into $C_2$ and $(C_3 + C_4 \ldots C_j)$ and this process is repeated $j$ times. As shown in the allocation tree of FIG. 6A, a buffer memory of R bits is sufficient for the multiplexing arrangement where the tree has R stages.

Figure 7:
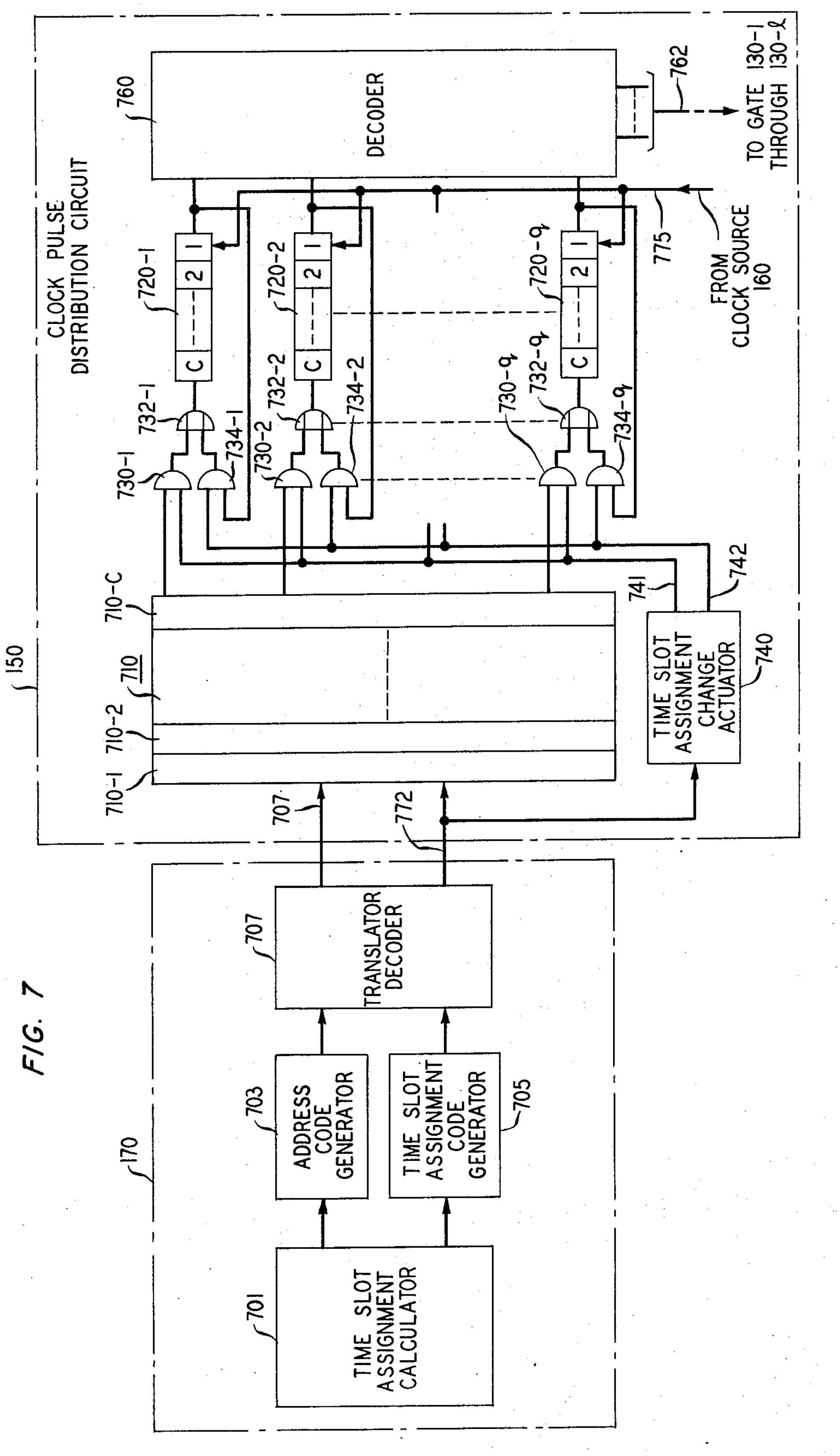
FIG. 7 shows a block diagram of a control unit and a clock pulse distribution circuit 1 that may be used in the illustrative embodiment of FIG. 1.

Control unit 170 and clock pulse distribution circuit 150 are shown in greater detail in FIG. 7. Referring to FIG. 7, time slot assignment calculator 701 may comprise a general purpose digital computer or one of several priorly known special purpose computers operative to calculate the time slots assigned to the respective inputs of FIG. 1 in accordance with equations 5 and 6.

The semiuniform time slot assignments of the invention may be implemented in time slot calculator 701 in several ways. According to one method, the transmission rates of input paths $C_1, C_2, \ldots C_n$ are stored together with the output path transmission rate C in calculator 701. An array of codes is then formed in accordance with well-known computer techniques. The codes correspond to a time slot allocation tree such as illustrated in FIG. 5C. Each node of the allocation tree has two branches connected to a pair of lower order nodes. The different input transmission rates are located at the lowest branches of the tree so that the formed array corresponds to a $\log_2 n$ stage tree.

There are four distinct transmission rates 2, 3, 4 and 5 in FIG. 5C whereby two node stages are used. The highest node stage represents the sum of all the input transmission rates (14). The next lower order nodes represent partial sums of the input transmission rates. The node associated with the rates of two and three is given the value of 5 and the node associated with rates 4 and 5 is given the value of 9. The lowest branches of the tree represent the individual input transmission rates. In general, there will be *n* lowest branches. If a lowest branch does not have a corresponding transmission rate, it is given the value of zero. A similar array may be formed corresponding to the tree arrangement of FIG. 6A wherein more than two branches emanate from some of the nodes.

After the code array is formed, time slots are assigned to each node and branch in descending order on the tree in accordance with equations 5 and 6 as hereinbefore set forth. The time slot assignment results corresponding to the lowest branches of the tree which are the semiuniform time slot assignments associated with the input transmission rates are then stored.

The time slot assignment results provide signals which are applied to time slot assignment code generator 705. In response to these time assignment signals, generator 705 generates time slot assignment codes. In addition to time slot results, calculator 701 also provides signals representing the input lines to which the assigned time slots are dedicated. These signals are applied to address code generator 703. Responsive to said addressing signals, generator 703 generates address codes for use in distribution circuit 150. Signals corresponding to both the address codes and the time slot assignment codes are applied to translator and decoder 707 which in turn generates signals that are transmitted to distribution circuit 150 via cables 770 and 772.

The signals on cable 770 are applied to memory 710 which comprises stores 710-1 through 710-C. Each of these stores corresponds to one time slot of the high speed line. Thus, for example, store 710-1, stores a code of *q* bits which code is used to address one of gates 130-1 through **130-*l* and to selectively apply a readout clock pulse to the corresponding buffer memory via cable 762. The time slot assignment codes from cable 772 are written into memory 710 in accordance with the address information on cable 770**. This is done utilizing the well-known techniques of memory insertion.

Shift registers 720-1 through **720-*q* operate at the clock rate determined by clock source 160 in response to signals applied to cable 775** from said clock source. Each of these shift registers contains *C* stages and is connected between the output of memory 710 corresponding to one bit of the assignment code and decoder 760. Information from memory 710 is inserted into the shift register arrangement via gates 730-1 through **730-*q*. The stored code of store 710-1 is applied via gates 730-1 through 730-*q* to stage one of registers 720-1 through 720-*q*. In this way, C codes are stored in the shift register arrangement. The codes corresponding to one stage of the shift registers are read out periodically to decoder 760. In each time slot, decoder 760** responds to the *q* bits from one stage of the shift register arrangement by providing a signal on cable 762 which signal is applied to enable one of gates 130-1 through **130-*l***.

The operation of each shift register, for example register 720-1, is in accordance with the well-known principles of recirculating register operation wherein the insertion of a bit into stage C is accomplished through gate 730-1 while gate 734-1 is blocked. In this way, new information is read into the register while the recirculating information at that bit position is removed. If during the course of operation it is necessary to change the time slot assignment of one or more positions, this is done via time slot assignment change actuator 740. The time slot change actuator comprises well-known logic circuits and is operative in response to a signal from cable 772 to open gates 730-1 through **730-*q* and inhibit gates 734-1 through 734-*q*. Since registers 720-1 through 720-*q* operate in synchronism with pulses from clock source 160**, the *q* bit code at each stage of the registers provides the information for selecting one of gates 130-1 through **130-*l*** in each output line time slot in accordance with equations 5 and 6.

What is claimed is:

1. A time division multiplex transmission system comprising an outgoing transmission path having a first transmission rate wherein a plurality of time slots occur in repetitive cycles, a plurality of incoming transmission paths each having a distinct transmission rate, the sum of said incoming transmission path rates being equal to said outgoing transmission path rate, each transmission rate having an integral multiple relationship with the other transmission rates, means connected to each incoming path for storing information bits sequentially received from said connected incoming path, means connected between each storing means and said outgoing path for gating said stored information bits from the connected incoming path onto said outgoing path in selected time slots, control means for designating the selected time slots for each storing means comprising means for successively dividing the sum of said incoming transmission path transmission rates C into pairs of groups of partial sums of said incoming path transmission rates *Ca* and *Cb*, means for assigning time slots to one partial sum group in accordance with $$\lceil (k-1)\, C'/Ca \rceil + 1 \quad (\text{for } k = 1, 2, \ldots Ca)$$

and for assigning time slots to the other partial sum group in accordance with $$[\, (k-1)\, C'/Cb ] + 2 \quad (\text{for } k = 1, 2, \ldots Cb)$$

where $\lceil\ \rceil$ indicates raising the included value to the next higher integer, [ ] indicates eliminating any included fractional value and $C' = Ca + Cb$, means for generating time slot assignment codes corresponding to each incoming path transmission rate, and means connected between said control means and each gating means for selectively applying signals corresponding to said time slot assignment codes from said control means to said gating means in each time slot.

2. A time division multiplex transmission system according to claim 1, wherever each storing means includes a plurality of single bit storage devices corresponding to the number of different incoming transmission rates.

3. A time division multiplex transmission system according to claim 2 further comprising means connected between each incoming path and the storing means connected to said incoming path for generating a first set of clock pulses synchronous to the transmission rate of said connected incoming path, means responsive to said first set of clock pulses for sequentially storing said connected incoming path information bits in said plurality of single bit storage devices, means for generating a second set of clock pulses synchronous to the transmission rate of said outgoing path, and wherein said signal applying means comprises means jointly responsive to said time slot assignment codes from said control means and said second clock pulses for applying a signal to a selected one of said gating means in each time slot.

4. A time division multiplex transmission system comprising an output transmission path having a transmission rate of C wherein C time slots occur in repetitive cycles, first and second input transmission paths having transmission rates of $Ca$ and $Cb$ respectively, where $$Ca + Cb = C,$$

$Ca \geq Cb$, first means for storing the information bits sequentially received from the first input transmission path at said $Ca$ rate, second means for storing the information bits sequentially received from the second input transmission path at said $Cb$ rate, means connected between each of said storing means and said output transmission path for sequentially gating said stored information bits from the connected storing means to said output path in selectively designated time slots of said cycle of C time slots, and control means connected to each of said gating means for selectively enabling said gating means to transfer information from said storing means to said output path in said selectively designated time slots, said control means comprising means for calculating time slot assignments for said $Ca$ transmission rate of said first input path in accordance with $$□(k-1)\ C/Ca□+1 \text{ (for } k=1, 2, \ldots Ca)$$

and for calculating time slot assignments for said $Cb$ transmission rate of said second input path in accordance with $$[\ (k\ \ 1)\ C/Cb\ ] + 2 \text{ (for } k = 1, 2, \ldots Cb)$$

where □□ indicates raising the included value to the next integer and [ ] indicates eliminating any included fractional value, and means responsive to said calculated time slot assignments for generating a set of $C$ time slot assignment codes.

5. A time division multiplex transmission system according to claim 4 wherein each of said storing means comprises a single bit store for storing one information bit.

6. In a time division communication system, the combination comprising $n \geq 2$ first transmission paths having transmission rates of $C1, C2, \ldots Ci \ldots Cn$, respectively, a second transmission path having a transmission rate of $$C = \sum_{i=1}^{n} Ci$$

a network for multiplexing information bits from said $n$ first paths onto said second path in repetitive cycles of C time slots of said second path comprising means connected to each first path for storing the information bits sequentially received from said connected first path, means connected between each storing means and said second path for sequentially gating said stored information bits from said storing means to said second path in selectively designated time slots of said $C$ time slots, means for enabling said gating means in said selectively designated time slots comprising means for assigning time slots to the information bits of each of said first paths on a semi-uniform basis, said assigning means comprising means for generating codes corresponding to $C1, C2, \ldots Ci \ldots Cn$ and $C$, means for forming an array of codes corresponding to a time slot allocation tree having $\log_2 (n)$ node stages, each node dividing into two branches, the codes corresponding to $C1, C2, \ldots C_i \ldots C_n$, being assigned to the lowest branches of said allocation tree array, the highest node of said allocation tree array having a code corresponding to transmission rate $C$, each branch of said array representing a preassigned partial sum of said first path transmission rates, means for calculating time slot assignments for each node comprising means for assigning time slots to one branch Ca of each node in accordance with $$□(k-1)\ C'/Ca□+ 1 \text{ (for } k = 1, 2, \ldots Ca)$$

and means for assigning time slots to the other branch $Cb$ of said node in accordance with $$[(k-1)\ C'/Cb\ ] + 2 \text{ (for } k = 1, 2, \ldots Cb)$$

where □□ indicates raising any included value to the next integer, [ ] indicates eliminating any included fractional value, and $C' = Ca + Cb$, means responsive to the calculated time slot assignments for the lowest branches of said array for generating a set of $C$ time slot assignment codes, and means connected between said code generating means and each of said gating means responsive to said time slot assignment codes for applying a signal to one of said gating means in assigned time slots of each cycle of said $C$ time slots.

7. A time division multiplex transmission system comprising an output transmission path having a transmission rate of C wherein C time slots occur in repetitive cycles, $n \geq 2$ input transmission paths having transmission rates of $C1$, $C2$,–Cn respectively, the sum of said input transmission rates being equal to $C$, means connected to each input transmission path for storing information bits sequentially received from said connected path, means connected between each storing means and said output path for sequentially gating said stored information bits from the connected storing means to said output path in selectively designated time slots of said output path, control means connected to each of said gating means for selectively enabling one of said gating means in each designated time slot of said output path, said control means comprising means for forming an array of codes corresponding to a time slot allocation tree having $\log_2(n)$ stages of nodes, each node having two branches and each branch being connected to a lower order node, means for calculating time slot assignments for each branch of said allocation tree, the $Ca$ time slots being assigned to one branch of a node in accordance with $$\lceil (k-1)\, C'/Ca \rceil + 1 \text{(for } k = 1, 2, \ldots, Ca)$$

the $Cb$ time slots assigned the other branch of a node in accordance with $$\lceil (k-1)\, Ca/C' - Ca \rceil + k + 1 \text{ (for } k = 1, 2, \ldots, Cb)$$

where $\lceil\ \rceil$ indicates raising any included fractional value to the next integer, $[\ ]$ indicates eliminating any included fractional value and $Cb = C' - Ca$, and means responsive to the time slots assigned to each transmission rate for applying a signal to a selected one of said gating means in said assigned time slots.

8. A time division multiplex transmission system according to claim 7 wherein each of said storing means comprise means for storing $n$ information bits from said connected input transmission path.

9. In a time division multiplex transmission system comprising an output transmission path having a transmission rate of C wherein C time slots occur in repetitive cycles, $n \geqslant 2$ input transmission paths having transmission rates of $C1, C2, \ldots Ci \ldots Cn$ where $$C = \sum_{i=1}^{n} Ci$$

means connected to each transmission path $i$ for storing the information received from the $i^{th}$ input path at a transmission rate of $Ci$, means connected between each storing means and said output transmission path for sequentially gating information bits from said storing means to said output transmission path in selectively determined time slots, a method for generating signals for selectively enabling one of said gating means in each time slot comprising the steps of 1. storing codes corresponding to said input transmission rate $C1, C2, \ldots C_i \ldots Cn$ and said output transmission rate $Ci$
2. forming an arrangement of codes corresponding to a $\log_2(n)$ stage nodal time slot allocation tree, each node having two branches and said codes corresponding to said stored input transmission rates $C1, C2, \ldots Ci \ldots Cn$ being allocated at the lowest branches of said tree;
3. generating a plurality of time slot assignment codes associated with each branch of said allocation tree, the time slots $Ca$ assigned to one branch of a node being $$\lceil (k-1)\, C'/Ca \rceil + 1 \text{ (for } k = 1, 2, \ldots Ca)$$

and the time slots assigned to the other branch of a node being $$[\, (k-1)\, C'/Cb\, ] + 2 \text{ (for } k = 1, 2, \ldots Cb)$$

where $Ca$ is the sum of the transmission rates at said one branch of the node, $Cb$ is the sum of the transmission rates at said other branch of the node, $C' = Ca + Cb$, $\lceil\ \rceil$ indicates raising the included value to the next integer, $[\ ]$ indicates eliminating any included fractional value,
4. generating codes corresponding to the time slot assignments at each lowest branch of said allocation tree; and
5. applying signals corresponding to said time slot assignment codes to selected gating means to selectively combine said stored information onto said output path.

10. In a time division multiplex transmission system comprising an outgoing transmission path having a transmission rate of $C$ wherein $C$ time slots occur in repetitive cycles, a first incoming transmission path having a bit transfer rate of $Ca$, a second incoming transmission path having a bit transfer rate of $Cb$, $$Ca \geqslant Cb,$$

$$Ca + Cb = C$$

first means connected to said first incoming path for storing the information bits sequentially received from said first incoming path, second means connected to said second incoming path for storing the information bits received from said second incoming path, first gating means connected between said first storing means and said outgoing path, second gating means connected between said second storing means and said outgoing path, means for enabling said first gating means in each of a first group of selected time slots of said $C$ time slots, means means for enabling said gating means in each of a second group of selected time slots of said $C$ time slots, a method for assigning time slots of said $C$ time slots to said first and second time slot groups comprising the steps of:

1. storing codes corresponding to $C$, $Ca$ and $Cb$;
2. determining in response to said stored transmission rate codes a set of time slot assignment codes for said first group in accordance with $$\lceil (k-1)\, C/Ca \rceil + 1 \text{ (for } k = 1, 2, \ldots Ca)$$

and a set of time slot assignment codes for said second group in accordance with $$[\, (k-1)\, C/Cb\, ] + 2 \text{ (for } k = 1, 2, \ldots Cb)$$

where $\lceil\ \rceil$ indicates raising the included value to the next integer $[\ ]$ eliminating any included fractional value;
3. applying an enabling signal corresponding to each time slot assignment code of said first group to said first gating means in each time slot assigned to said first group; and 4. applying an enabling signal corresponding to each time slot assignment code of said second group to said gating means in each time slot assigned to said second group.

11. In a time division multiplex transmission system comprising a plurality of transmission paths each having a distinct transmission rate, an outgoing transmission path having a transmission rate of $C$ equal to the sum of said incoming path transmission rates wherein $C$ time slots occur in each repetitive cycle, each of said transmission rates having an integral multiple relationship with the other transmission rates, means for multiplexing the information bits of said incoming paths onto said outgoing path in each of said repetitive cycles of $C$ time slots comprising means connected to each incoming path for sequentially receiving information bits from said connected incoming path, means connected to said receiving means for storing the received information bits comprising a number of said storing devices corresponding to the number of different transmission rate incoming paths, means for gating the output of each storing means onto said outgoing path in selected time slots of each repetitive cycle of $C$ time slots, and means for applying signals to each of said gating mans for enabling each of said gating means in said selected time slots, a method for assigning time slots to the gating means associated with each incoming path comprising the steps of:

1. storing codes corresponding to said incoming path transmission rates and said outgoing path transmission rate;
2. successively dividing said outgoing path rate into pairs of groups of partial sums of said incoming transmission rates $Ca$ and $Cb$, $Ca \geqslant Cb$;
3. assigning time slots of each repetitive cycle of $C$ time slots to one partial sum group in accordance with $$\lceil (k-1)\, C'/Ca \rceil + 1 \text{ (for } k = 1, 2, \ldots Ca)$$

and assigning time slots to the other partial sum group in accordance with $$[(k-1)C'/Cb] + 2 \text{ for } (k = 1,2, \ldots Cb)$$

where $\lceil\ \rceil$ indicates raising the included value to the next higher integer, [ ] indicates eliminating any included fractional value and $C' = Ca + Cb$; and 4. generating time slot assignment codes corresponding to each incoming path transmission rate.

* * * * *

UNITED STATES PATENT OFFICE
CERTIFICATE OF CORRECTION

Patent No. 3,692,942 Dated September 19, 1972

Inventor(s) Hiroshi Inose; Tadao Saito; Takehisa Tokunaga; Kenji Tomizawa

It is certified that error appears in the above-identified patent and that said Letters Patent are hereby corrected as shown below:

Column 1, line 41, "to" should read --a--. Column 5, line 2, "writetin" should read --write-in--. Column 5, line 16, "259-n" should read --250-n--. Column 5, line 49, "occurs" should read --occur--. Column 6, line 15, "then" should read --than--. Column 8, line 24 "$C_2$--," should read --$C_2$,...,--. Column 8, line 44 "$C_2$--," should read --$C_2$,...,--. Column 11, line 61, "(k 1)" should read (k-1)--. Column 12, line 45, boxes are not distinct. Column 12, line 66, "C2,--" should read --C2,...,--. Column 13, line 56, "Ci" should read --$C_i$--. Column 14, line 43, delete "means" second occurrence. Column 15, line 24, "mans" should read --means--.

Signed and sealed this 20th day of February 1973.

(SEAL)
Attest:

EDWARD M.FLETCHER,JR.
Attesting Officer

ROBERT GOTTSCHALK
Commissioner of Patents

FORM PO-1050 (10-69)

USCOMM-DC 60376-P69
U.S. GOVERNMENT PRINTING OFFICE 1969 O—366-334